United States Patent
Santra et al.

(10) Patent No.: US 12,264,281 B2
(45) Date of Patent: Apr. 1, 2025

(54) REPAIRING WELLBORE CEMENT STRUCTURES AND RELATED COMPOSITIONS

(71) Applicant: SAUDI ARABIAN OIL COMPANY, Dhahran (SA)

(72) Inventors: Ashok Santra, Houston, TX (US); Arthur Hale, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/446,819

(22) Filed: Aug. 9, 2023

(65) Prior Publication Data
US 2025/0051629 A1 Feb. 13, 2025

(51) Int. Cl.
| | |
|---|---|
| C09K 8/487 | (2006.01) |
| C04B 14/06 | (2006.01) |
| C04B 24/24 | (2006.01) |
| C04B 103/20 | (2006.01) |
| C04B 103/44 | (2006.01) |
| C04B 103/46 | (2006.01) |

(52) U.S. Cl.
CPC .............. *C09K 8/487* (2013.01); *C04B 14/06* (2013.01); *C04B 24/24* (2013.01); *C04B 2103/20* (2013.01); *C04B 2103/44* (2013.01); *C04B 2103/46* (2013.01); *C04B 2201/50* (2013.01)

(58) Field of Classification Search
CPC ......... C09K 8/487; C04B 14/06; C04B 14/24; C04B 2103/20; C04B 2103/44; C04B 2103/46; C04B 2201/50
See application file for complete search history.

(56) References Cited

U.S. PATENT DOCUMENTS

| | | | |
|---|---|---|---|
| 6,540,018 B1 | 4/2003 | Vinegar et al. | |
| 10,655,044 B2 | 5/2020 | Al-Yami et al. | |
| 10,655,045 B2 | 5/2020 | Al-Yami et al. | |
| 2006/0144591 A1* | 7/2006 | Gonzalez | E21B 29/10 166/57 |
| 2017/0088466 A1* | 3/2017 | Li | B29C 73/18 |
| 2020/0354622 A1* | 11/2020 | Sherman | C09K 8/508 |
| 2023/0295483 A1* | 9/2023 | Liang | C08L 53/025 166/293 |
| 2023/0340854 A1* | 10/2023 | Fripp | E21B 33/1208 |

FOREIGN PATENT DOCUMENTS

| | | |
|---|---|---|
| CN | 104418965 A | 3/2015 |
| CN | 109180084 A | 1/2019 |
| WO | 2016053237 A1 | 4/2016 |

* cited by examiner

*Primary Examiner* — Crystal J Lee
(74) *Attorney, Agent, or Firm* — Vorys, Sater, Seymour and Pease, LLP

(57) ABSTRACT

A self-healing cement structure may be used for repairing defects. An example method of using such a cement structure includes: providing a cement structure in a wellbore, wherein the cement structure includes: a cement and elastomer particles at 1% by weight of the cement (bwoc) to 25% bwoc; applying heat to the cement structure to heat at least a portion of the elastomer particles above a melting point of an elastomer of the elastomer particles to cause at least a portion of the elastomer to melt and infiltrate into a defect in the cement structure; and allowing the elastomer to cool below the melting point of the elastomer to yield a repaired cement structure.

14 Claims, 1 Drawing Sheet

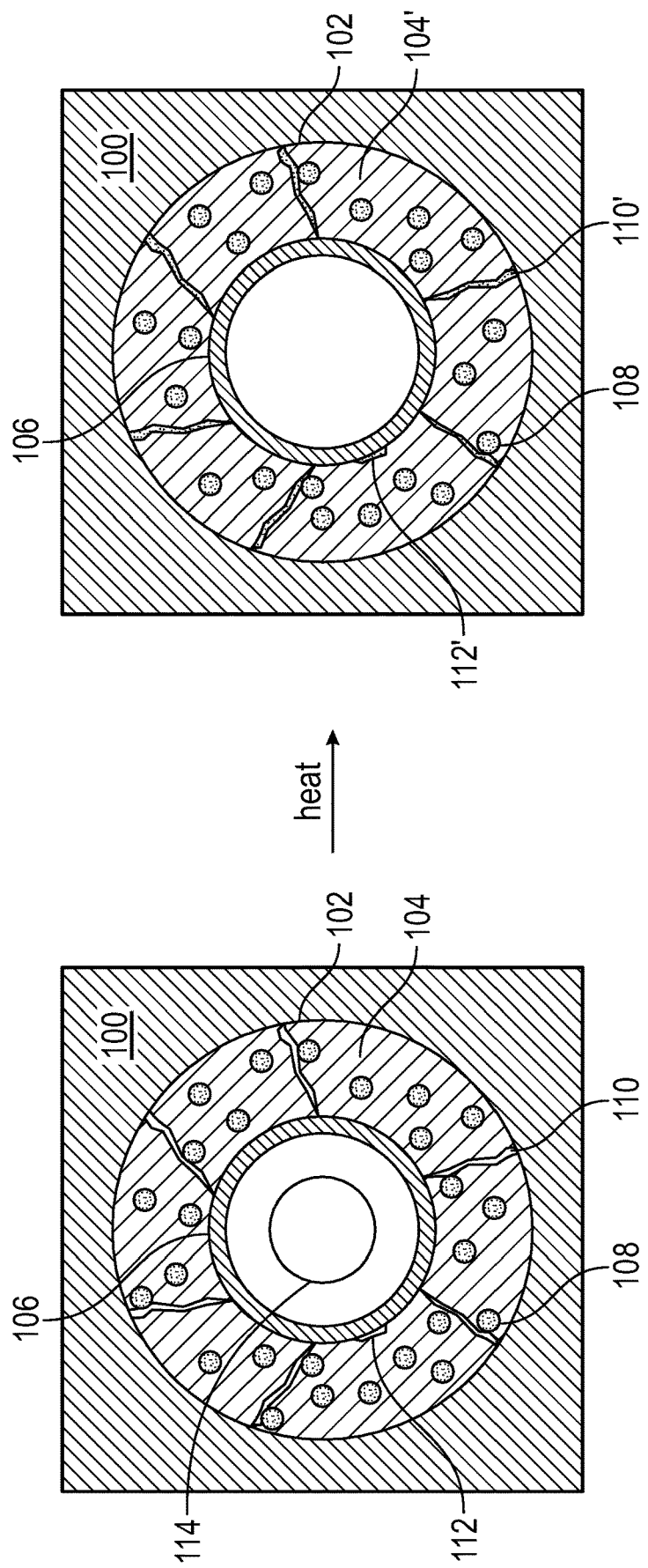

REPAIRING WELLBORE CEMENT STRUCTURES AND RELATED COMPOSITIONS

FIELD OF THE DISCLOSURE

Embodiments in accordance with the present disclosure generally relate to compositions and methods for repairing damage to wellbore cement structures.

BACKGROUND OF THE DISCLOSURE

Cement slurries are used in the oil and gas industries, such as for cementing in oil and gas wells. Primary, remedial, squeeze, and plug cementing techniques can be used, for instance, to place cement sheaths in an annulus between a tubular (e.g., a casing) and a wall of the wellbore, for well repairs, well stability, or for well abandonment (sealing an old well to eliminate safety hazards). These cement slurries should be able to consistently perform over a wide range of temperatures and conditions as cement set in an oil and gas well may be vulnerable to cyclic stresses imposed by pressure and temperature fluctuations.

Wellbore cement sheaths may undergo mechanical failure due to various wellbore related stresses like fracturing, pressurizing, perforating, and the like. After mechanical failure, an expensive remedial operation like squeezing resin or micro-cement may be required to repair such cracks in the wellbore cement sheath. Inadequate sealing from the original cracks or inadequate remedial operations may cause a fire hazard, an environmental hazard, a lack of zonal isolation, a loss of pressure behind casing. Depending on the severity, these risks may lead to catastrophic accidents, failures, or well-abandonment.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting method of the present disclosure includes: providing a cement structure in a wellbore, wherein the cement structure comprises: a cement and elastomer particles at 1% by weight of the cement (bwoc) to 25% bwoc; applying heat to the cement structure to heat at least a portion of the elastomer particles above a melting point of an elastomer of the elastomer particles to cause at least a portion of the elastomer to melt and infiltrate into a defect in the cement structure; and allowing the elastomer to cool below the melting point of the elastomer to yield a repaired cement structure.

A second nonlimiting method of the present disclosure includes: pumping a cement slurry to a location within a wellbore, wherein the cement slurry comprises: a cement precursor material, water at 40% by weight of the cement (bwoc) to 200% bwoc, and 1% bwoc to 25% bwoc of elastomer particles, and wherein the location has a static temperature that is less than a melting point of an elastomer of the elastomer particles; and curing the cement slurry to a cement structure at the location in the wellbore.

Another embodiment of the present disclosure includes a cement slurry, the cement slurry comprising: a cement precursor material; water at 40% by weight of the cement (bwoc) to 200% bwoc; 1% bwoc to 25% bwoc of elastomer particles.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

The FIGURE illustrates diagram for a method for repairing a damaged cement structure is in an annulus between a wellbore and a tubular.

DETAILED DESCRIPTION

Embodiments of the present disclosure will now be described in detail with reference to the accompanying FIGURE(s). Like elements in the various FIGURE(s) may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying FIGURE(s) may vary without departing from the scope of the present disclosure.

Embodiments in accordance with the present disclosure generally relate to compositions and methods for repairing damage to cement structures. More specifically, the compositions (e.g., cement slurries and set cement structures) and related methods of the present disclosure include elastomer particles as an additive that allows for at least partially filling cracks and fissures in a damaged cement structure in situ. In doing so, the repaired cement structure may have improved mechanical properties (e.g., low to no permeability and high compressive strength) relative to the damaged cement structure, where said properties may be the same or similar to the mechanical properties of the original set cement structure.

Cement slurries for producing said structure of the present description may include water, a cement precursor material, and elastomer particles. The cement precursor material may be any suitable material which, when mixed with water, can be cured into a cement. The cement precursor material may be hydraulic or non-hydraulic. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters, and oxychloride. A non-hydraulic cement precursor may take longer to harden or may require drying conditions for proper strengthening, but often is more economically feasible. While hydraulic cement may be more commonly utilized in drilling applications, it should be understood that other cements are contemplated.

Examples of cement precursor material may include, but are not limited to, calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), gypsum ($CaSO_4 \cdot 2H_2O$) sodium oxide, potassium oxide, limestone, lime (calcium oxide), hexavalent chromium, calcium aluminate, other similar compounds, the like, and any combination thereof. The cement precursor material may, for example, include Portland cement, siliceous fly ash, calcareous fly ash, slag cement, silica fume, silica sand, any known cement precursor material, the like, or any combination thereof.

The water in the cement slurry may be distilled water, deionized water, tap water, brackish water, formation water, produced water, raw seawater, or filtered seawater. For instance, the water may include freshwater or seawater, natural or synthetic brine, or salt water.

The water may be present in the cement slurry at 40% by weight of the cement (bwoc) to 200% bwoc (or 40% bwoc to 100% bwoc, or 60% bwoc to 150% bwoc, or 100% bwoc to 200% bwoc).

Elastomer particles in the set cement structures and cement slurries described herein are particles that comprise one or more elastomers. Elastomer particles in the set cement structures and cement slurries described herein may be particles that consist of one or more elastomers.

Examples of elastomers may include, but are not limited to, poly(acrylonitrile), poly(6-aminocaproic acid), poly(trans-butadiene), poly(1-butene), poly(caprolactam), poly(decamethylene adipamide) (also known as nylon 10,6), poly(decamethyleen sebacamide) (also known as nylon 10,10), poly(hexamethylene adipamide) (also known as nylon 6,6), poly(hexamethylene sebacamide) (also known as nylon 6,10), poly(hexamethlyeen suberamide) (also known as nylon 6,8), poly($\omega$-undecanamide) (also known as nylon 11), poly(etheretherketone), poly(ethylene adipate), poly(ethylene oxide), poly(ethylene terephthalate), poly(ethylene), poly(methyl methacrylate) (isotactic or syndiotactic), poly(methylene oxide), poly(4-methylpentene), poly(propylene), poly(styrene) (isotactic or syndiotactic), poly(tetramethylene oxide), poly(trans-1,4-butadiene), poly(vinyl alcohol), poly(vinyl chloride), poly(vinyl fluoride), poly(vinylidene chloride), poly(vinylidene fluoride), and any combination thereof.

Elastomer particles may have a weight average diameter of 0.1 micron to 1 mm (or 0.1 micron to 100 microns, or 10 microns to 250 microns, or 100 microns to 500 microns, or 250 microns to 1 mm, or 1 micron to 1 mm, or 1 micron to 100 microns).

Elastomer particles may be present in the cement slurry at 1% bwoc to 25% bwoc (or 2% bwoc to 10% bwoc, or 5% bwoc to 20% bwoc, or 10% bwoc to 25% bwoc).

The cement slurry may also contain additives. Examples of additives may include, but are not limited to, crystalline silica, a weighting agent, a retarder, a viscosifier, a fluid loss control agent, the like, and any combination thereof.

Crystalline silica may be present in the cement slurry at 30% bwoc to 70% bwoc (or 30% bwoc to 50% bwoc, or 40% bwoc to 60% bwoc, or 50% bwoc to 70% bwoc). Examples of suitable crystalline silica may include, but are not limited to, SSA-1 (100 mesh size) and SSA-2 (200 mesh size), both available commercially from Halliburton.

Examples of weighting agents may include, but are not limited to, hematite, ilmenite, barite, the like, and any combination thereof.

Weighting agents may be present in the cement slurry at 1% bwoc to 100% bwoc (or 1% bwoc to 25% bwoc, or 15% bwoc to 50% bwoc, or 30% bwoc to 70% bwoc, or 50% bwoc to 85% bwoc, or 65% bwoc to 100% bwoc).

Retarders are chemical agents that increase the thickening time of cement slurries to enable proper placement of the cement slurry within the wellbore. Examples of retarders may include, but are not limited to, lignosulfonates (e.g., HR®-5 available from Halliburton), hydroxycarboxylic acids, cellulose derivatives, the like, and any combination thereof.

Retarders may be present in the cement slurry at 1% bwoc to 5% bwoc (or 1% bwoc to 4% bwoc, or 3% bwoc to 5% bwoc).

Examples of viscosifiers may include, but are not limited to, biological polymers, clays, ethoxylated alcohols, polyether glycols, the like, and any combination thereof. Biological polymers and their derivatives may include, but are not limited to, polysaccharides, including xanthan gums, welan gums, guar gums, cellulose gums, corn, potato, wheat, maize, rice, cassava, and other food starches, succinoglycan, carrageenan, scleroglucan, carboxymethyl cellulose, polyanionic cellulose, hydroxyethyl cellulose (HEC), the like, and any combination thereof. Clays may include, but are not limited to, bentonite, sepiolite, attapulgite, montmorillionite, the like, and any combination thereof. Polyether glycols may include, but are not limited to, polyethylene glycols, polypropylene glycols, the like, and any combination thereof.

Viscosifiers may be present in the cement slurry at 1% bwoc to 5% bwoc (or 1% bwoc to 4% bwoc, or 3% bwoc to 5% bwoc).

Examples of fluid loss control agents may include, but are not limited to, HEC, polyvinyl alcohol, polyethylencimine, polyalkanolamines, polyacrylamides, liquid latex, 2-acrylamido-2-methylpropan sulfonic acid (AMPS), a carboxylic fatty acid having from 16 to 18 carbon atoms (e.g., palmitic acid, palmitoleic acid, vaccenic acid, oleic acid, elaidic acid, linoleic acid, $\alpha$-linolenic acid, $\gamma$-linolenic acid, and stearidonic acid), bentonite, the like, and any combination thereof.

Fluid loss control agents may be present in the cement slurry at 1% bwoc to 10% bwoc (or 1% bwoc to 5% bwoc, or 3% bwoc to 7% bwoc, or 5% bwoc to 10% bwoc).

Following introduction of the cement slurry into the wellbore, the cement slurry may form cement through curing. As used throughout the description, "curing" refers to providing adequate moisture, temperature, and time to allow the concrete to achieve the desired properties (such as hardness) for its intended use through one or more reactions between the water and the cement precursor material. Curing may be a passive step where no physical action is needed (such as cement that cures in ambient conditions when untouched). In contrast, "drying" refers to merely allowing the concrete to achieve a moisture condition appropriate for its intended use, which may only involve physical state changes, as opposed to chemical reactions. Curing the cement slurry may refer to passively allowing time to pass under suitable conditions upon which the cement slurry may harden or cure through allowing one or more reactions between the water and the cement precursor material. Suitable conditions may be any time, temperature, pressure, humidity, and other appropriate conditions known in the cement industry to cure a cement composition. Suitable curing conditions may be ambient conditions. Alternatively, curing may also involve actively hardening or curing the cement slurry by, for instance, introducing a curing agent to the cement slurry, providing heat or air to the cement slurry, manipulating the environmental conditions of the cement slurry to facilitate reactions between the water and the cement precursor, a combination of these, or other such means. Curing may occur at a relative humidity of greater than or equal to 80% in the cement slurry and a temperature of greater than or equal to 50° F. for a time period of from 1 to 14 days.

Once the cement slurry is cured, the cured cement constitutes a cement structure within the wellbore. The cement structure will have various properties that indicate the physical strength of the cement structure. For instance, Young's modulus measures the ratio of the stress (force per unit area) along an axis to the strain (ratio of deformation over initial length) along that axis. Thus, Young's modulus can be used to show the elasticity or stiffness of the cement structure within the wellbore and gives insight into the tensile strength of the cement structure. Poisson's ratio is a measure of transverse strain to axial strain, and measures the deformation capacity of the cement structure. The greater the deformation capacity (that is, the greater Poisson's ratio) the less likely the cement structure will be damaged as temperature and pressure changes within the wellbore. In one or more embodiments, the Young's modulus and the Poisson's ratio of the cement structure was measured 10 days after curing, 20 days after curing, and 30 days after curing.

The cured cement structure may have a compressive strength (measured by ASTM C109/C109M-20 after curing the corresponding cement slurry at 190° F. and 3000 psi for 7 days) of 2000 psi to 4000 psi (or 2000 psi to 3000 psi, or 2500 psi to 3500 psi, or 3000 psi to 4000 psi).

Over time, the cement structure may be damaged causing the compressive strength to reduce. Methods of the present disclosure use the elastomer particles in the set cement structure for repairing said damage.

The FIGURE illustrates diagram for a method of repairing a damaged cement structure 104 is in an annulus between a wellbore 102 and a tubular 106 (e.g., a casing) (or alternatively, an annulus between two tubulars (e.g., between two casings)). The cement structure 104 contains therein elastomer particles 108, as described in more detail herein. Over time, the cement structure 104 can develop defects (e.g., cracks 110 and/or a microannulus 112) that reduce the mechanical properties of the cement structure 104. Repairing the cement structure 104 includes applying heat (e.g., via heater 114) to portions of the cement structure 104 that have cracks 110 and/or microannulus 112, where the amount of heat supplied is sufficient to melt the elastomer of the elastomer particles 108 (or is sufficient to heat the elastomer to a temperature above the melting point of the elastomer). This may cause at least a portion of the elastomer to melt and infiltrate into the cracks 110 and/or the microannulus 112 in the cement structure, which, after cooling to a temperature below the melting point of the elastomer, yields a repaired cement structure 104' with cracks 110' and/or the microannulus 112' at least partially filled with elastomer.

Because the elastomer provides structural integrity during operation, the location of the cement structure 104 (or any other cement structure to be repaired per the present disclosure) should be in an environment that is at a temperature less than (at least 1° C. less than, or 1° C. to 10° C. less than, or 1° C. to 100° C. less than, or 5° C. to 25° C. less than, or 10° C. to 100° C. less than) the melting point of the elastomer. For example, the wellbore 102 should have a bottom hole static temperature less than (at least 1° C. less than, or 1° C. to 10° C. less than, or 1° C. to 100° C. less than, or 5° C. to 25° C. less than, or 10° C. to 100° C. less than) the melting point of the elastomers of the elastomer particle.

The repaired cement structure may have a compressive strength (measured by ASTM C109/C109M-20) of 1500 psi or greater (or 1500 psi to 3500 psi, or 1500 psi to 2500 psi, or 1500 psi to 3000 psi, or 2000 psi to 3500 psi).

The heating is to a temperature above the melting point of the elastomer, and the cooling is to a temperature below the melting point of the elastomer.

The heat may be applied by positioning a heater positioned in the wellbore at or near the cement structure (e.g., in the wellbore radially inward of the cement structure). Examples of heaters may include, but are not limited to, a mineral insulated heater, a Currie heater, a thermite heater, the like, and any combination thereof. An example mineral insulated heater may include (from the core radially outward) a heating element (e.g., a copper conductor), an insulator (e.g., magnesium oxide), and a sheath (e.g., stainless steel). Advantageously, mineral insulated heaters and Currie heaters may be deployed to treat multiple locations along the wellbore. In contrast, thermite heaters are typically one-use heaters.

The heater may be positioned within the wellbore using, for example, a wireline or a coiled tubing.

For example, an assembly for downhole deployment of the heater above a coiled tubing and below a production pump may include: a split hanger fixing the cable assembly coming out of the coiled tubing; and a seal connectable to the split hanger, configured to prevent formation fluid from entering the coiled tubing. The set of connectors may include: a coiled tubing connector, configured to connect the assembly to the coiled tubing; a lower connector, an upper part of the lower connector being adapted to receive, at least in part, the split hanger and the seal; an upper connector arranged above the lower connector; an adjusting nut; the upper connector and the adjusting nut being connectable to each other, thereby fixing the assembly relative to the coiled tubing; and a lower part of the upper connector having an exit enabling the cable assembly to extend out of the assembly.

The heater may be positioned and stay static during heating. Alternatively, the heater may be moved along the wellbore while heating. The rate of movement along the wellbore should be adjusted to allow for ample time for the elastomer particles to at least partially melt and infiltrate defects in the cement structure.

Nonlimiting Example Embodiments

Embodiment 1. A method comprising: providing a cement structure in a wellbore, wherein the cement structure comprises: a cement and elastomer particles at 1% by weight of the cement (bwoc) to 25% bwoc; applying heat to the cement structure to heat at least a portion of the elastomer particles above a melting point of an elastomer of the elastomer particles to cause at least a portion of the elastomer to melt and infiltrate into a defect in the cement structure; and allowing the elastomer to cool below the melting point of the elastomer to yield a repaired cement structure.

Embodiment 2. The method of Embodiment 1, wherein the repaired cement structure has a compressive strength of 1500 psi or greater.

Embodiment 3. The method of Embodiment 1 or 2, wherein the cement structure has a compressive strength of 2000 psi to 4000 psi.

Embodiment 4. The method of any one of Embodiments 1-3, wherein the cement structure is located in an annulus between a tubular and a wellbore.

Embodiment 5. The method of any one of Embodiments 1-4, wherein the defect is a crack.

Embodiment 6. The method of any one of Embodiments 1-5, wherein the defect is a microannulus.

Embodiment 7. The method of any one of Embodiments 1-6, wherein the cement structure further comprises: 30% bwoc to 70% bwoc of a crystalline silica; 1% bwoc to 100% bwoc of a weighting agent; 0.1% bwoc to 5% bwoc of a retarder; 0.1% bwoc to 5% bwoc of a viscosifier; and 0.1% bwoc to 10% bwoc of a fluid loss control agent.

Embodiment 8. The method of any one of Embodiments 1-7, wherein the elastomer comprises one or more compositions selected from the group consisting of: poly(acrylonitrile), poly(6-aminocaproic acid), poly(trans-butadiene), poly(l-butene), poly(caprolactam), poly(decamethylene adipamide), poly(decamethyleen sebacamide), poly(hexamethylene adipamide), poly(hexamethylene sebacamide), poly(hexamethlyeen suberamide), poly(ω-undecanamide), poly(etheretherketone), poly(ethylene adipate), poly(ethylene oxide), poly(ethylene terephthalate), poly(ethylene), poly(methyl methacrylate), poly(methylene oxide), poly(4-methylpentene), poly(propylene), poly(styrene), poly(tetramethylene oxide), poly(trans-1,4-butadiene), poly(vinyl alcohol), poly(vinyl chloride), poly(vinyl fluoride), poly(vinylidene chloride), poly(vinylidene fluoride), and any combination thereof.

Embodiment 9. The method of any one of Embodiments 1-8, wherein the elastomer particles have a weight average diameter of 0.1 micron to 1 mm.

Embodiment 10. The method of any one of Embodiments 1-9, wherein the applying of the heat comprises: positioning a heater within the wellbore at or near the cement structure; and causing the heater to apply the heat.

Embodiment 11. The method of Embodiment 10, wherein the heater is a mineral insulated heater, a Currie heater, or a thermite heater.

Embodiment 12. The method of Embodiment 10 or 11, wherein the positioning of the heater uses a wireline.

Embodiment 13. The method of Embodiment 10 or 11, wherein the positioning of the heater uses a coiled tubing.

Embodiment 14. The method of any one of Embodiments 1-9, wherein the applying of the heat comprises: moving a heater along the wellbore at or near the cement structure; and causing the heater to apply the heat while moving the heater.

Embodiment 15. A method comprising: pumping a cement slurry to a location within a wellbore, wherein the cement slurry comprises: a cement precursor material, water at 40% by weight of the cement (bwoc) to 200% bwoc, and 1% bwoc to 25% bwoc of elastomer particles, and wherein the location has a static temperature that is less than a melting point of an elastomer of the elastomer particles; and curing the cement slurry to a cement structure at the location in the wellbore.

Embodiment 16. The method of Embodiment 15, wherein the location is an annulus between a tubular and a wellbore.

Embodiment 17. The method of Embodiment 15 or 16, wherein the cement slurry further comprises: 30% bwoc to 70% bwoc of a crystalline silica, 1% bwoc to 100% bwoc of a weighting agent, 0.1% bwoc to 5% bwoc of a retarder, 0.1% bwoc to 5% bwoc of a viscosifier, and 0.1% bwoc to 10% bwoc of a fluid loss control agent.

Embodiment 18. The method of any one of Embodiments 15-17, wherein the cement structure has a compressive strength of 2000 psi to 4000 psi.

Embodiment 19. The method of any one of Embodiments 15-18, wherein the elastomer comprises one or more compositions selected from the group consisting of: poly(acrylonitrile), poly(6-aminocaproic acid), poly(trans-butadiene), poly(l-butene), poly(caprolactam), poly(decamethylene adipamide), poly(decamethyleen sebacamide), poly(hexamethylene adipamide), poly(hexamethylene sebacamide), poly(hexamethlyeen suberamide), poly(ω-undecanamide), poly(etheretherketone), poly(ethylene adipate), poly(ethylene oxide), poly(ethylene terephthalate), poly(ethylene), poly(methyl methacrylate), poly(methylene oxide), poly(4-methylpentene), poly(propylene), poly(styrene), poly(tetramethylene oxide), poly(trans-1,4-butadiene), poly(vinyl alcohol), poly(vinyl chloride), poly(vinyl fluoride), poly(vinylidene chloride), poly(vinylidene fluoride), and any combination thereof.

Embodiment 20. A cement slurry comprising: a cement precursor material; water at 40% by weight of the cement (bwoc) to 200% bwoc; 1% bwoc to 25% bwoc of elastomer particles.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:
providing a cement structure in a wellbore, wherein the cement structure comprises: a cement and elastomer particles at 1% by weight of the cement (bwoc) to 25% bwoc;

applying heat to the cement structure to heat at least a portion of the elastomer particles above a melting point of an elastomer of the elastomer particles to cause at least a portion of the elastomer to melt and infiltrate into a defect in the cement structure; and allowing the elastomer to cool below the melting point of the elastomer to yield a repaired cement structure.

2. The method of claim 1, wherein the repaired cement structure has a compressive strength of 1500 psi or greater.

3. The method of claim 1, wherein the cement structure has a compressive strength of 2000 psi to 4000 psi.

4. The method of claim 1, wherein the cement structure is located in an annulus between a tubular and a wellbore.

5. The method of claim 1, wherein the defect is a crack.

6. The method of claim 1, wherein the defect is a microannulus.

7. The method of claim 1, wherein the cement structure further comprises: 30% bwoc to 70% bwoc of a crystalline silica; 1% bwoc to 100% bwoc of a weighting agent; 0.1% bwoc to 5% bwoc of a retarder; 0.1% bwoc to 5% bwoc of a viscosifier; and 0.1% bwoc to 10% bwoc of a fluid loss control agent.

8. The method of claim 1, wherein the elastomer comprises one or more compositions selected from the group consisting of: poly(acrylonitrile), poly(6-aminocaproic acid), poly(trans-butadiene), poly(l-butene), poly(caprolactam), poly(decamethylene adipamide), poly(decamethyleen sebacamide), poly(hexamethylene adipamide), poly(hexamethylene sebacamide), poly(hexamethlyeen suberamide), poly(co-undecanamide), poly(etheretherketone), poly(ethylene adipate), poly(ethylene oxide), poly(ethylene terephthalate), poly(ethylene), poly(methyl methacrylate), poly(methylene oxide), poly(4-methylpentene), poly(propylene), poly(styrene), poly(tetramethylene oxide), poly(trans-1,4-butadiene), poly(vinyl alcohol), poly(vinyl chloride), poly(vinyl fluoride), poly(vinylidene chloride), poly(vinylidene fluoride), and any combination thereof.

9. The method of claim 1, wherein the elastomer particles have a weight average diameter of 0.1 micron to 1 mm.

10. The method of claim 1, wherein the applying of the heat comprises: positioning a heater within the wellbore at or near the cement structure; and causing the heater to apply the heat.

11. The method of claim 10, wherein the heater is a mineral insulated heater, a Currie heater, or a thermite heater.

12. The method of claim 10, wherein the positioning of the heater uses a wireline.

13. The method of claim 10, wherein the positioning of the heater uses a coiled tubing.

14. The method of claim 1, wherein the applying of the heat comprises: moving a heater along the wellbore at or near the cement structure; and causing the heater to apply the heat while moving the heater.

* * * * *